US012420388B2

(12) United States Patent
Chiang

(10) Patent No.: US 12,420,388 B2
(45) Date of Patent: Sep. 23, 2025

(54) MAGNETIC DRIVING DEVICE

(71) Applicant: SHIN YING ENTPR CO., LTD., Taichung (TW)

(72) Inventor: Wen-Hung Chiang, Taichung (TW)

(73) Assignee: SHIN YING ENTPR CO., LTD., Taichung (TW)

( * ) Notice: Subject to any disclaimer, the term of this patent is extended or adjusted under 35 U.S.C. 154(b) by 386 days.

(21) Appl. No.: 18/305,842

(22) Filed: Apr. 24, 2023

(65) Prior Publication Data

US 2024/0351173 A1 Oct. 24, 2024

(51) Int. Cl.

*B25B 23/12* (2006.01)
*B25B 13/06* (2006.01)
*B25B 23/00* (2006.01)

(52) U.S. Cl.

CPC .............. *B25B 23/12* (2013.01); *B25B 13/06* (2013.01); *B25B 23/0035* (2013.01)

(58) Field of Classification Search

CPC ..... B25B 23/12; B25B 23/0035; B25B 13/06; B25B 13/065

See application file for complete search history.

(56) References Cited

U.S. PATENT DOCUMENTS

| | | | | |
|---|---|---|---|---|
| 2,720,804 | A * | 10/1955 | Brown | H01F 7/0257 81/125 |
| 3,207,010 | A * | 9/1965 | Wendling | B25B 23/12 267/179 |
| 6,973,858 | B2 * | 12/2005 | Huang | B25B 23/0035 81/177.85 |
| 7,581,470 | B1 * | 9/2009 | Huang | B25B 23/0035 279/22 |
| 11,065,744 | B2 * | 7/2021 | Zimmermann | B23B 31/1071 |
| 11,167,398 | B2 * | 11/2021 | Chen | B25B 23/0035 |
| 11,325,230 | B2 * | 5/2022 | Chiang | B25B 23/0035 |
| 2014/0311302 | A1 * | 10/2014 | Taguchi | B25B 23/0035 81/125 |
| 2018/0326565 | A1 * | 11/2018 | Wang | B25B 23/0035 |
| 2020/0023502 | A1 * | 1/2020 | Zimmermann | B23B 31/1071 |
| 2022/0402104 | A1 * | 12/2022 | Chang | B25B 23/12 |

* cited by examiner

*Primary Examiner* — David B. Thomas
(74) *Attorney, Agent, or Firm* — Muncy, Geissler, Olds & Lowe, P.C.

(57) ABSTRACT

A magnetic driving device is provided, including: a sleeving rod, including a connection hole and a receiving hole in communication with the connection hole which are disposed at one end of the sleeving rod, the connection hole being configured to receive a workpiece, a first groove being disposed on a hole wall of the receiving hole; a movable member, received in the receiving hole, including a magnetic end portion and a second groove; a retainer, sleeved on the movable member, extending radially within the first groove and the second groove, axially movable in the first groove; and an elastic member, received in the receiving hole and located between the sleeving rod and the movable member.

10 Claims, 5 Drawing Sheets

MAGNETIC DRIVING DEVICE

BACKGROUND OF THE INVENTION

Field of the Invention

The present invention relates to a magnetic driving device.

Description of the Prior Art

Screwdrivers are often used to fasten or unfasten screws on objects. Since the driving force applied to the screwdriver by hand is maybe insufficient to drive the screw, or there are many screws to be driven, it is necessary to use a power tool with a tool adapter and/or a bit to reduce the burden on the user and to speed up the operation efficiency.

During operation on screws or fasteners of different sizes or types, it is necessary to replace different bits or working head. However, many conventional tool adapters are not provided with a structure for fast and stable connection of workpieces, and thus it is time-consuming. Furthermore, the structure of the conventional tool adapter is usually complicated and difficult to assemble.

The present invention is, therefore, arisen to obviate or at least mitigate the above-mentioned disadvantages.

SUMMARY OF THE INVENTION

The main object of the present invention is to provide a magnetic driving device which has a simple structure, is easy to assemble, and can be connected with the workpiece quickly and stably.

To achieve the above and other objects, a magnetic driving device is provided, including: a sleeving rod, including a connection hole and a receiving hole in communication with the connection hole which are disposed at one end of the sleeving rod, the connection hole being configured to receive a workpiece, a first groove being disposed on a hole wall of the receiving hole; a movable member, received in the receiving hole, including a magnetic end portion and a second groove; a retainer, sleeved on the movable member, extending radially within the first groove and the second groove, axially movable in the first groove; and an elastic member, received in the receiving hole and located between the sleeving rod and the movable member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
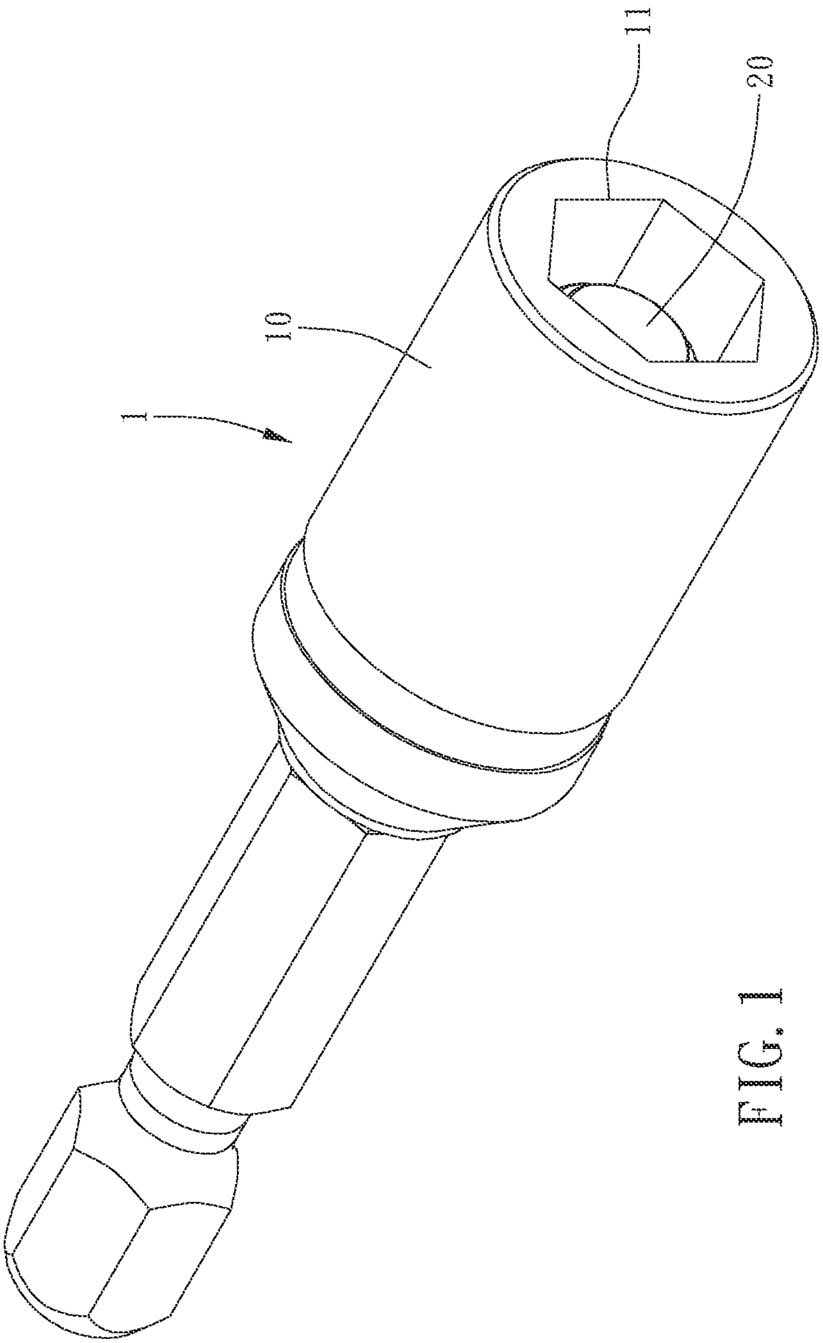
FIG. 1 is a stereogram of an exemplar embodiment of the present invention.
Figure 2:
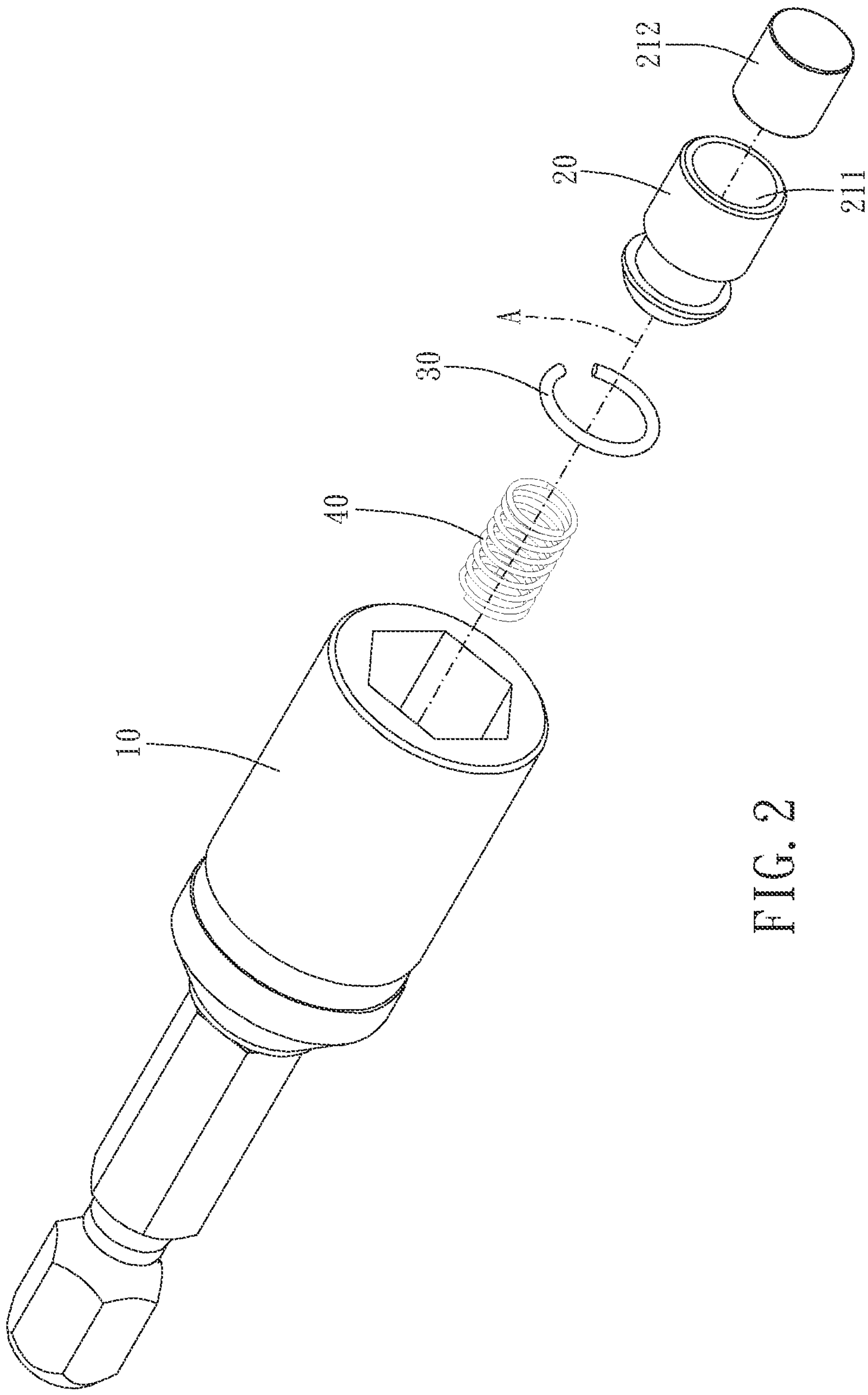
FIG. 2 is a breakdown drawing of an exemplar embodiment of the present invention.
Figure 3:
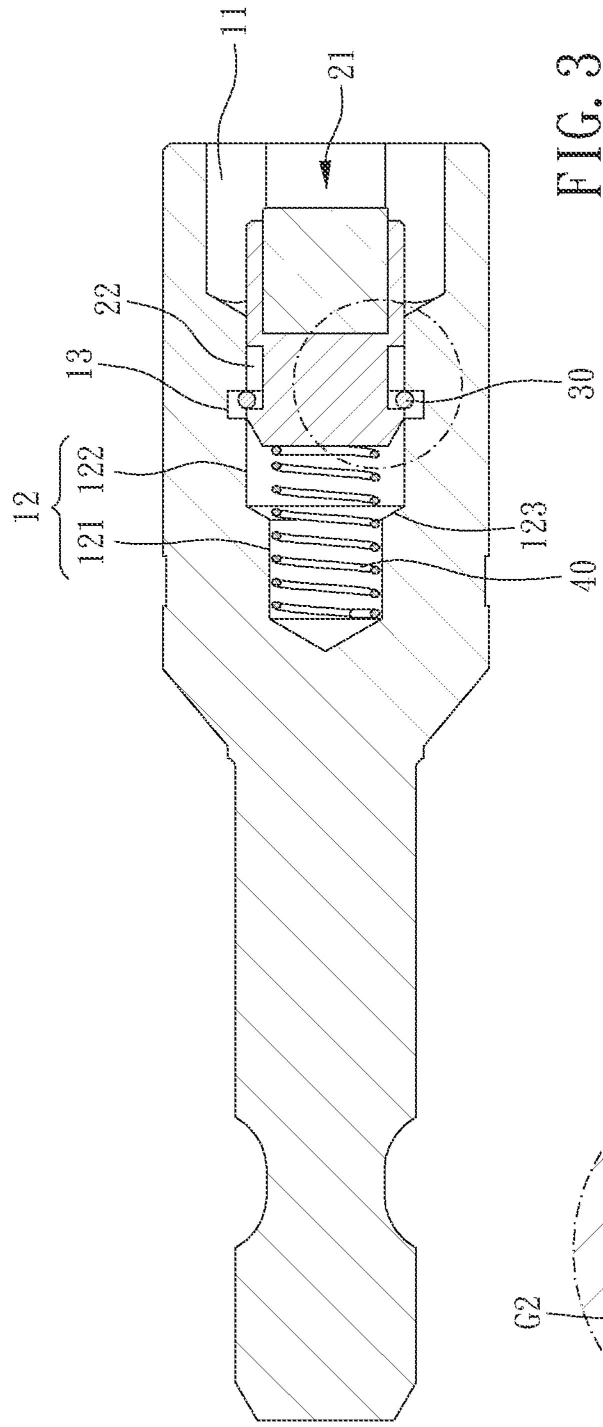
FIG. 3 is a cross-sectional view of an exemplar embodiment of the present invention.
Figure 4:
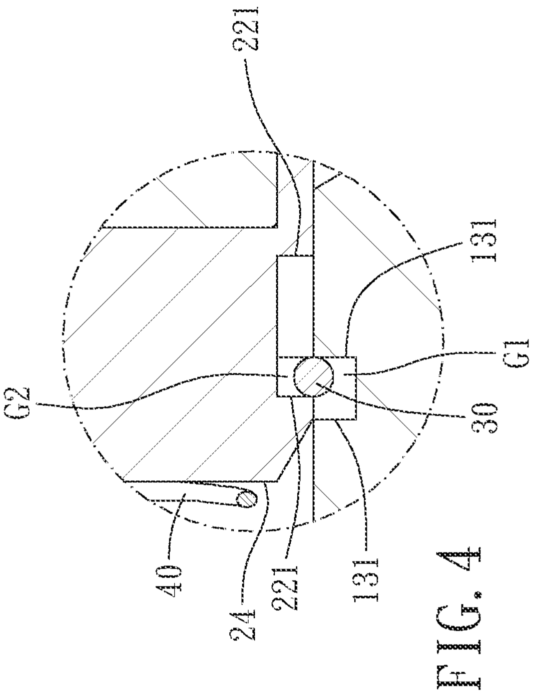
FIG. 4 is a partial enlargement of FIG. 3.
Figure 5:
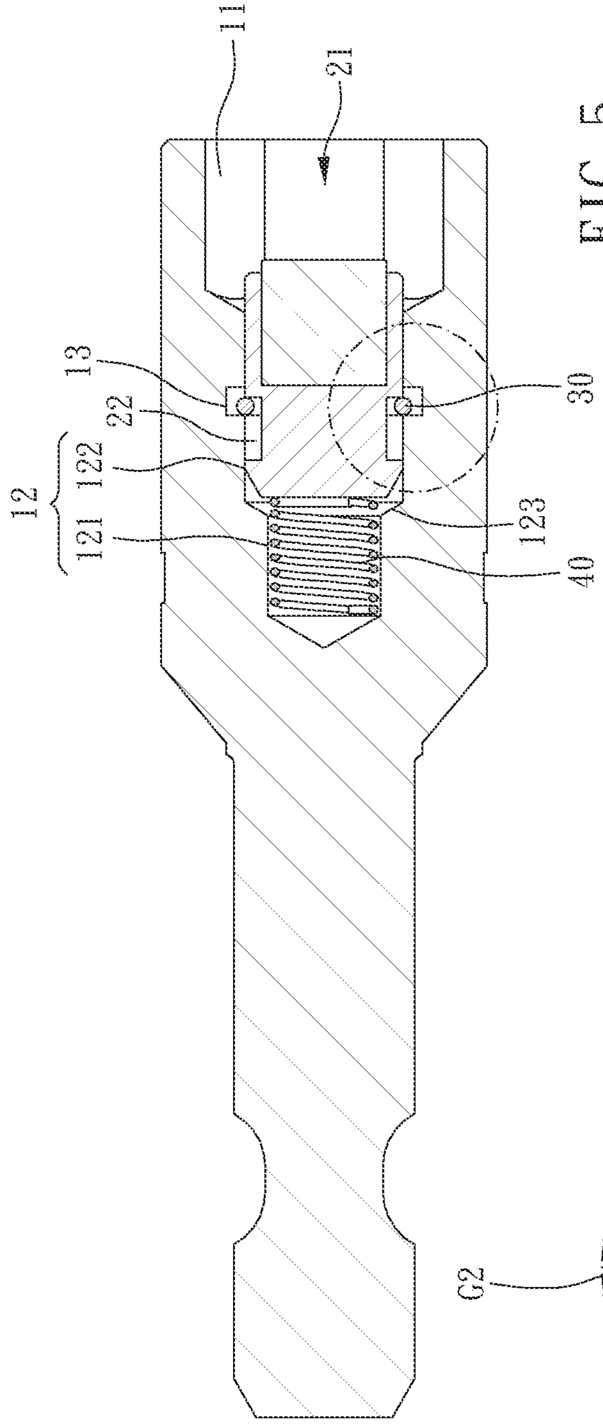
FIG. 5 is another cross-sectional view of an exemplar embodiment of the present invention.
Figure 6:
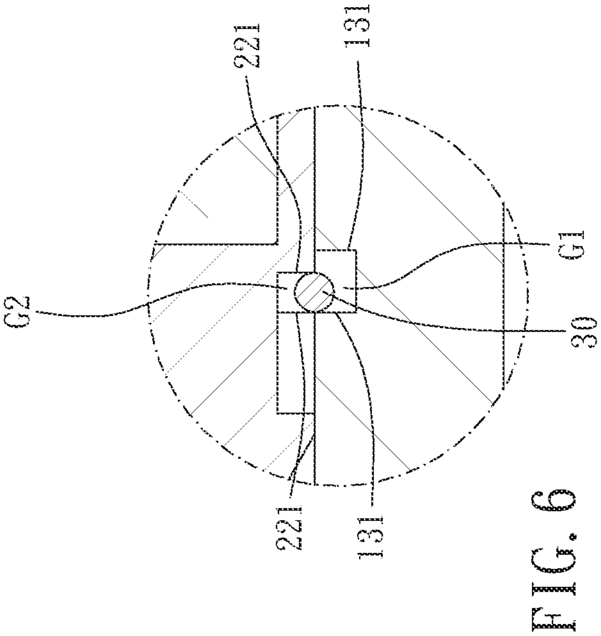
FIG. 6 is a partial enlargement of FIG. 5.
Figure 7:
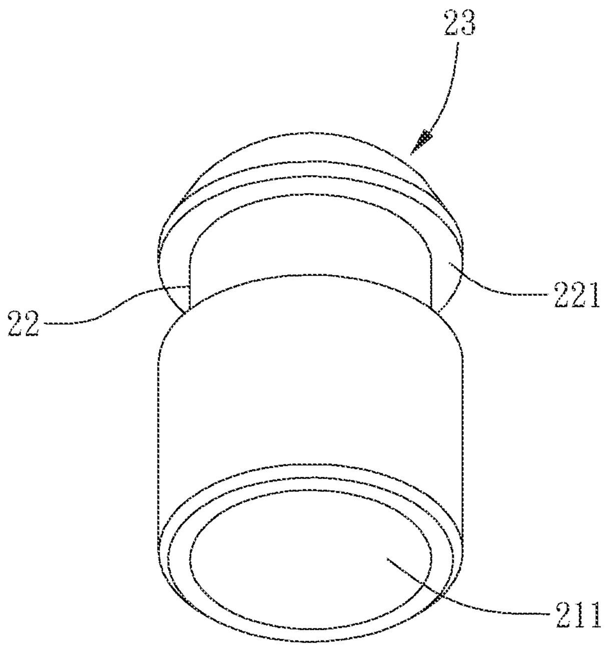
FIG. 7 is a drawing showing a movable member according to an exemplar embodiment of the present invention.

Please refer to FIGS. 1 to 7 for an exemplar embodiment of the present invention. A magnetic driving device 1 of the present invention includes a sleeving rod 10, a movable member 20, a retainer 30 and an elastic member 40.

The sleeving rod 10 includes a connection hole 11 and a receiving hole 12 in communication with the connection hole 11 which are disposed at one end of the sleeving rod 10, the connection hole 11 is configured to receive a workpiece (such as fasteners, tool bits, adapter or the like), and a first groove 13 is disposed on a hole wall of the receiving hole 12. The movable member 20 is received in the receiving hole 12, and the movable member 20 includes a magnetic end portion 21 and a second groove 22. The retainer 30 is sleeved on the movable member 20 and extends radially within the first groove 13 and the second groove 22, and the retainer 30 is movable in an axial direction A in the first groove 13. The elastic member 40 is received in the receiving hole 12 and located between the sleeving rod 10 and the movable member 20. As such, the magnetic driving device has a simple structure, is easy to assemble, and can be connected with the workpiece quickly and stably.

The retainer 30 is a wire member, and in the axial direction A, the first groove 13 has a width equal to or larger than 1.5 times a diameter of the wire member, the second groove 22 has a width equal to or larger than 3.0 times a diameter of the wire member. As such, the sleeving rod 10 can be shorter and can be provide a large space for movement of the movable member 20. Preferably, the cross-section of the wire member is circular, and the wire member extends radially within the first groove 13 and the second groove 22 for distances equal to or larger than 0.3 times a diameter of the wire member, respectively. There is a first radial clearance G1 between the retainer 30 and a bottom of the first groove 13, and there is a second radial clearance G2 between the retainer 30 and a bottom of the second groove 22, thus lowering friction between members and avoiding damage.

Specifically, the first groove 13 includes two first shoulders 131 axially opposite to each other, the second groove 22 includes two second shoulders 221 axially opposite to each other, and the retainer 30 is abuttable against and between one of the two first shoulders 131 and one of the two second shoulders 221. The receiving hole 12 includes a small diameter section 121 and a large diameter section 122 which is in communication with and between the connection hole 11 and the small diameter section 121. The movable member 20 is inserted in the large diameter section 122, the elastic member 40 is inserted in the small diameter section 121, and the large diameter section 122 includes the first groove 13. The receiving hole 12 further includes a tapered surface 123 facing the movable member 20, and the tapered surface 123 is conical. When the retainer 30 is abuttable against and between one of the two first shoulders 131 and one of the two second shoulders 221, the movable member 20 and the tapered surface 123 are axially distanced from each other, which avoids damage caused to the movable member 20.

Preferably, the movable member 20 further includes a tapered end portion 23 tapered toward a direction away from the magnetic end portion 21, the tapered end portion 23 is conical, and the second groove 22 is located between the magnetic end portion 21 and the tapered end portion 23. In assembling, the tapered end portion 23 can push the retainer 30 to move to engage radially within the first groove 13, the tapered end portion 23 can radially expand the retainer 30 so that the tapered end portion 23 can pass through the retainer 30 and the retainer 30 can engage radially within the second groove 22.

In this embodiment, the movable member 20 further includes an end plane 24 opposite to the magnetic end portion 21, and the elastic member 40 is abutted against the end plane 24. Since the tapered end portion 23 of the movable member 20 including the end plane 24 is solid and has good structural strength, the movable member 20 is not damaged easily when the tapered end portion 23 expands and passes through the retainer 30.

The magnetic end portion 21 includes a receiving room 211 and a magnetic member 212 engaged in the receiving room 211, and thus it is to assemble/disassemble. When the retainer 30 is abuttable against and between one of the two first shoulders 131 and one of the two second shoulders 221, at least three fifths of the magnetic member 212 are located within the receiving hole 12, such that it improves attraction to the workpiece. Preferably, the elastic member 40 is abuttable radially against a circumferential wall of the small diameter section 121 so that the elastic member 40 is stably mounted.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A magnetic driving device, including:

a sleeving rod, including a connection hole and a receiving hole in communication with the connection hole which are disposed at one end of the sleeving rod, the connection hole being configured to receive a workpiece, a first groove being disposed on a hole wall of the receiving hole;

a movable member, received in the receiving hole, including a magnetic end portion and a second groove;

a retainer, sleeved on the movable member, extending radially within the first groove and the second groove, axially movable in the first groove; and an elastic member, received in the receiving hole and located between the sleeving rod and the movable member.

2. The magnetic driving device of claim 1, wherein the retainer is a wire member, and in the axial direction, the first groove has a width equal to or larger than 1.5 times a diameter of the wire member.

3. The magnetic driving device of claim 2, wherein the first groove includes two first shoulders axially opposite to each other, the second groove includes two second shoulders axially opposite to each other, and the retainer is abuttable against and between one of the two first shoulders and one of the two second shoulders.

4. The magnetic driving device of claim 3, wherein the receiving hole includes a tapered surface facing the movable member, and when the retainer is abuttable against and between one of the two first shoulders and one of the two second shoulders, the movable member and the tapered surface are axially distanced from each other.

5. The magnetic driving device of claim 3, wherein a cross-section of the wire member is circular, the wire member extends radially within the first groove and the second groove for distances equal to or larger than 0.3 times a diameter of the wire member, respectively; the second groove has a width equal to or larger than 3.0 times a diameter of the wire member; the movable member further includes an end plane opposite to the magnetic end portion, and the elastic member is abutted against the end plane; the magnetic end portion includes a receiving room and a magnetic member engaged in the receiving room; the movable member further includes a tapered end portion tapered toward a direction away from the magnetic end portion, the tapered end portion is conical, and the second groove is located between the magnetic end portion and the tapered end portion; the receiving hole includes a small diameter section and a large diameter section which is in communication with and between the connection hole and the small diameter section, the movable member is inserted in the large diameter section, the elastic member is inserted in the small diameter section, and the large diameter section includes the first groove; the elastic member is abuttable against a circumferential wall of the small diameter section; the receiving hole includes a tapered surface facing the movable member, and when the retainer is abuttable against and between one of the two first shoulders and one of the two second shoulders, the movable member and the tapered surface are axially distanced from each other, and at least three fifths of the magnetic member are located within the receiving hole; there is a first radial clearance between the retainer and a bottom of the first groove, and there is a second radial clearance between the retainer and a bottom of the second groove.

6. The magnetic driving device of claim 2, wherein the second groove has a width equal to or larger than 3.0 times a diameter of the wire member.

7. The magnetic driving device of claim 1, wherein the movable member further includes a tapered end portion tapered toward a direction away from the magnetic end portion, and the second groove is located between the magnetic end portion and the tapered end portion.

8. The magnetic driving device of claim 1, wherein the receiving hole includes a small diameter section and a large diameter section which is in communication with and between the connection hole and the small diameter section, the movable member is inserted in the large diameter section, the elastic member is inserted in the small diameter section, and the large diameter section includes the first groove.

9. The magnetic driving device of claim 8, wherein the elastic member is abuttable radially against a circumferential wall of the small diameter section.

10. The magnetic driving device of claim 1, wherein there is a first radial clearance between the retainer and a bottom of the first groove, and there is a second radial clearance between the retainer and a bottom of the second groove.

* * * * *